Jan. 4, 1966     D. W. FRENCH     3,227,476

ASBESTOS PAPER COUPLING

Filed June 22, 1961

INVENTOR.
DAVID W. FRENCH
BY John A. McKinney
ATTORNEY

United States Patent Office 3,227,476
Patented Jan. 4, 1966

3,227,476
ASBESTOS PAPER COUPLING
David W. French, Plainfield, N.J., assignor to Johns-Manville Corporation, New York, N.Y., a corporation of New York
Filed June 22, 1961, Ser. No. 118,958
4 Claims. (Cl. 285—292)

This invention relates to a coupling for ducts and while it has utility in other types of installations is particularly adapted for use with warm air ducts for perimeter heating or air conditioning.

In modern basementless homes, the trend in the building industry is to utilize perimeter heating or air conditioning comprising air ducts which are positioned within the concrete slab on which the home is constructed. In this type of construction, it is most desirable that the air duct have a permanence at least equal to the concrete slab forming the basis for the house. Therefore, it is only natural that asbestos-cement pipe, because of its lasting structural and physical characteristics, is utilized for such installations. However, as is readily apparent, the asbestos-cement pipe must be joined by a suitable coupling which should have a permanence comparable to that of the asbestos-cement pipe. Furthermore, such couplings should have characteristics permitting rapid assembly under all types of conditions including installation through all ranges of temperature. Also, the joint, comprising the coupling and the adjacent pipe ends, must meet Federal Housing specifications such as being water-tight from without under a 5 foot head of water. Prior couplings utilized for connecting adjacent pipe ends in this type of installation such as: taped joints; rigid tapered pipe and coupling joints; and the lacing type of joint, were either too cumbersome to facilitate rapid assembly or could not be utilized under all types of conditions.

A primary object of the instant invention is to provide a coupling for asbestos-cement pipe to form a joint which may be rapidly assembled under all types of conditions.

Another object of the instant invention is to provide a coupling for asbestos-cement pipe which requires no machining of the pipe ends or couplings to provide a water-tight joint.

A further object of the instant invention is to provide a stretchable coupling for asbestos-cement pipe.

The foregoing objects are accomplished in accordance with the instant invention by providing a coupling for use with asbestos-cement pipe in air duct installations comprising a plurality of laminated layers of asbestos paper having desirable elongation characteristics joined together with a conventional latex material. Each end of the coupling is provided with a tapered entrance for easy insertion of the pipe end into the coupling and to accommodate readily any irregularities of the outside surface of the pipe end. Also, such coupling will accommodate asbestos-cement pipe having irregular outside diameters. The inner surface of the coupling is coated with a material which is hydroscopic in nature to insure the water tightness of the joint. A laminate of a desired type of protective material is provided around the outer surface of the laminations of asbestos paper. Air ducts for providing perimeter heating or air conditioning are readily assembled by utilizing the coupling of the instant invention by slipping the coupling over the end of a first pipe and inserting the end of an adjacent second pipe into the other end of the coupling and pushing the second pipe towards the first pipe.

The invention will be more fully understood and further objects and advantages thereof will become apparent when reference is made to the following detailed description of a preferred embodiment of the invention and the accompanying drawing in which.

Figure 1:
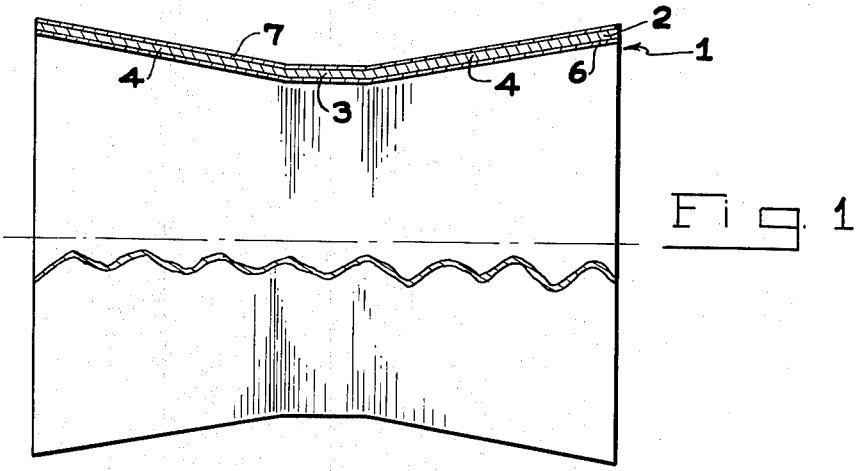
FIG. 1 is a side elevation partially in cross section of a coupling constructed in accordance with the instant invention.
Figure 2:
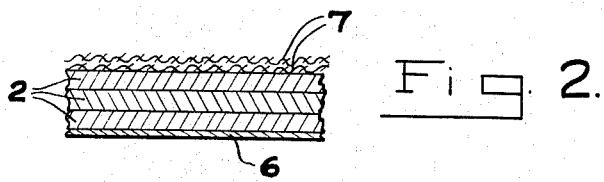
FIG. 2 is an enlarged fragmentary view in cross section of a portion of the coupling of FIG. 1.
Figure 3:
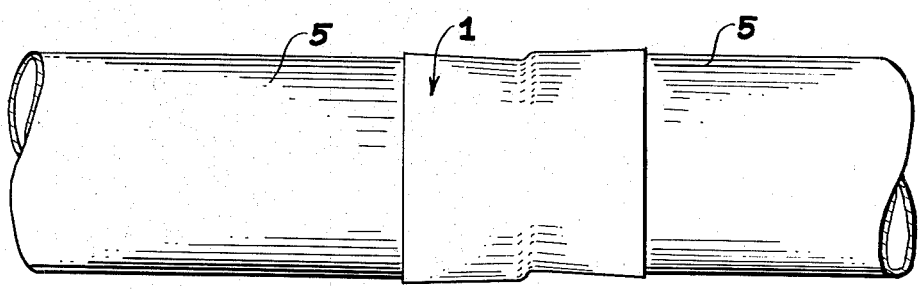
FIG. 3 is a side elevation of a completed joint comprising two pipe ends and a coupling.

The pipe coupling, as illustrated in FIG. 1, comprises a 3-ply laminate of an asbestos paper 2 bonded together by a suitable latex material. The number of plies of the laminate is determined by the thickness of the asbestos paper and the desired thickness of the coupling 1. The asbestos paper utilized in the instant invention desirably has an elongation characteristic of at least 4%, for purposes to be described below. The coupling 1 has a central portion 3 having substantially cylindrical inner and outer surfaces and two entrance sections 4 having tapered inner and outer surfaces with the smaller diameter thereof being adjacent the central portion 3. The tapered entrance sections 4 together with the stretchable characteristics of asbestos paper allow for the easy insertion of the pipe end 5 into the coupling and for any irregularities of the pipe end such as protuberances on the outside diameter, varying outside diameters, or out-of-roundness of the pipe. Also, as particularly illustrated in FIG. 3, the coupling 1 has sufficient flexibility, to allow for the misalignment of the pipe ends. This flexibility is desired primarily from the asbestos paper and presents a decided advantage over other types of couplings.

The inner surface of the coupling 1 is provided with a coating 6 of a material which preferably is hydroscopic in nature. The coating 6 may be applied to the entire inner surface of the coupling 1, as illustrated in FIG. 1, or may comprise bands of the coating material on each of the inner surfaces of the entrance sections 4 since it is only necessary that the coating be on that area of the coupling contacted by the associated pipe end. However, since the coupling 1 is designed to accommoadte any irregularities of the pipe ends, the band of coating material on the tapered sections of the coupling must be sufficiently wide to insure contact thereof by the associated pipe end.

To provide the coupling 1 with more resistance to tear and to increase its wet strength, a laminate comprising 1½ to 3 laminations of a suitable protective material 7 is wrapped around the outer surface of the lamination of asbestos paper. Also, a thin coating (not shown) of a surfacing material, such as a water resistant latex, is applied to the outer surface of the lamination of protective material to add a degree of stiffness and more water resistance to the coupling.

A suitable method of forming the coupling of the instant invention is to impregnate asbestos paper with a latex material and then form the coupling on a conventional winding apparatus utilizing the principle of convolute winding. As stated previously, the number of plies is determined by the thickness of the asbestos paper utilized and the desired final thickness of the coupling which thickness is generally approximately ⅟₁₆ of an inch. In the preferred embodiment of the instant invention, the asbestos paper comprises an asbestos paper sized with an acrylic binder and having a thickness of approximately 15 mils, such as that marketed by Johns-Manville as a staple article of commerce under the trade designation "QUINORGO 5000." This paper is supplied to conventional convolute winding apparatus to form a coupling having three plies or laminations. Also, in the preferred embodiment of the instant invention, the latex material utilized for impregnating the asbestos paper prior to the convolute winding operation comprises a water based latex such as a water emulsion acrylonitrile latex such as that marketed as a staple article of commerce by Goodyear Rubber Company under the trade designation "CHEMIGUM 248." After thus forming the asbestos paper, between 1½ to 3 laminations of a protective material is applied to the outer surface of the lamination of asbestos paper. The protective material prior to lamination is impregnated with a solution comprising, a water emulsion acrylonitrile latex, such as that described above, and a suitable waterproofing material such as a waterproofing latex such as that marketed as a staple article of commerce by Firestone Tire & Rubber Co. under the trade designation "BUTAPRENE L" to bind the protective material to the adjacent surface of the asbestos paper and to its own laminations and add water resistance and a degree of stiffness to the coupling. In the preferred embodiment of the instant invention, the protective material comprises a glass cloth scrim having a 20—20 mesh and a 150 1/0 yarn. Other types of protective materials include suitable types of plastic materials such as a polyester film such as that marketed as a staple article of commerce by DuPont Chemical Co. under the trade designation "Mylar."

After air drying for between 50 to 60 minutes, the coupling of asbestos paper and the protective material is then placed between two forms, each shaped like a frustum of a right circular cone, which are placed into the inside diameter of the coupling so as to stretch the coupling to conform to the tapered peripheries of the forms. Both forms are heated to between 180 to 212° F. so as to accelerate the cure of but not to vulcanize the water base laminant. The coupling dwell time on the tapered form is approximately 10 seconds.

In order that the tapered portions 4 of the coupling retain sufficient stretchability to accommodate the irregularities of the pipe ends 5, as described above, the asbestos paper, from which the coupling is formed, should have an elongation characteristic of at least 4%.

After the coupling has been thus formed, a coating 6 is applied to the inner surface of the coupling. As described above, this coating may be applied to the entire inner surface of the coupling or may consist of bands of coating material applied only to the entrance sections 4. This coating is very important to the coupling as it functions to unite the coupling and the associated pipe ends to form a water-tight joint which has the required physical characteristics and also meets all Federal Housing specifications. The coating material is preferably hygroscopic in nature, which coating is brittle when dry but sticky when wet, and in the preferred embodiment of the invention, the coating comprises an acrylic resin such as the type marketed by Alco Oil and Chemical Corporation as a staple article of commerce and identified by the trade designation "Alcogum AN–10." This acrylic resin is cut back 50% with water before being utilized in the instant invention. Another type of acrylic resin is that marketed as a staple article of commerce by Rohm and Haas Chemical Co. under the trade designation "Acrysol-GS" or Acrysol G–110." In the instant application, the term "acrylic resins" comprises aqueous solutions of polymeric acrylic salts such as an aqueous solution of sodium polyacrylate. The acrylic resin reacts with the free lime of the asbestos-cement pipe when wetted, such wetting comprising either an actual wetting of the material or the absorption of moisture of the atmosphere, to amalgamate the asbestos fibers in the asbestos-cement pipe and the asbestos paper of the coupling. Thus, a tight and lasting union is made between the coupling and the associated pipe end.

Couplings may be made in accordance with the instant invention for utilization with any of the standard air duct size which generally comprise asbestos-cement pipe within the ranges of 3 to 12 inches in inside diameter. Each coupling is approximately 4 inches in axial extent and each entrance section should be at least 1 inch in axial extent and in the preferred embodiment is approximately 1¾ inches in axial extent with a taper of approximately 6°. Couplings of this nature will readily accommodate pipe of the specified size having varying outside diameters as long as the pipe end may be inserted at least ½ inch into the tapered portion prior to contacting the inner surface of the coupling.

While the invention has been described in rather full detail, it will be understood that these details need not be strictly adhered to and that various changes and modifications may suggest themselves to one skilled in the art, all falling within the scope of the invention as defined by the subjoined claims.

What I claim is:

1. A joint comprising a pair of adjacent asbestos-cement pipe ends, a coupling having openings at opposite axial extremities thereof for receiving said pipe ends, said coupling comprising a plurality of laminations of asbestos paper, said coupling extending between and joining said pipe ends, and means comprising an acrylic resin coating on the inner surface of said coupling adjacent said openings for amalgamating the asbestos fibers in adjacent portions of said pipe ends and said asbestos paper in said coupling.

2. A joint comprising a pair of adjacent asbestos-cement pipe ends, a coupling having openings at opposite axial extremities thereof for receiving said pipe ends, said coupling comprising a central portion having a substantially cylindrical inner surface and a pair of entrance sections having tapered inner surfaces with the smaller diameter of said taper being adjacent said central portion, said coupling comprising a plurality of laminations of asbestos paper, said coupling extending between and joining said pipe ends, and means comprisnig an acrylic resin coating on at least the inner surface of said tapered entrance sections for amalgamating the asbestos fibers in adjacent portions of said pipe ends and said asbestos paper in said coupling.

3. A joint as defined in claim 2 wherein said laminations of asbestos paper are bonded together by a water based latex.

4. A joint as defined in claim 3 and further including a lamination of protective material over said laminations of asbestos paper.

References Cited by the Examiner

UNITED STATES PATENTS

| 1,811,277 | 6/1931 | Mosley | 285—417 |
| 2,050,023 | 8/1936 | Slayer | 285—293 |
| 2,056,304 | 10/1936 | Sweet | 285—383 |
| 2,379,990 | 7/1945 | Rembert | 285—292 |
| 2,498,831 | 2/1950 | Veitch | 285—260 |
| 2,726,682 | 12/1955 | Conroy et al. | 285—254 |
| 2,890,899 | 6/1959 | Simmons | 285—235 |

FOREIGN PATENTS 660,339   11/1951   Great Britain.

CARL W. TOMLIN, *Primary Examiner.*